(12) United States Patent
Dallmann

(10) Patent No.: US 12,470,298 B2
(45) Date of Patent: Nov. 11, 2025

(54) CALIBRATION OF ALIGNMENT ERRORS OF A COMMUNICATION UNIT BY MEANS OF THE MOON

(71) Applicant: Tesat-Spacecom GmbH & Co. KG, Backnang (DE)

(72) Inventor: Daniel Dallmann, Backnang (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 258 days.

(21) Appl. No.: 18/367,715

(22) Filed: Sep. 13, 2023

(65) Prior Publication Data

US 2024/0106541 A1 Mar. 28, 2024

(30) Foreign Application Priority Data

Sep. 22, 2022 (DE) .......................... 102022124389.3

(51) Int. Cl.
*H04B 10/40* (2013.01)
*H04B 10/112* (2013.01)
*H04B 10/118* (2013.01)

(52) U.S. Cl.
CPC ......... *H04B 10/40* (2013.01); *H04B 10/1129* (2013.01); *H04B 10/118* (2013.01)

(58) Field of Classification Search
CPC .... H04B 10/1129; H04B 10/118; H04B 10/40
(Continued)

(56) References Cited

U.S. PATENT DOCUMENTS 5,777,768 A * 7/1998 Korevaar ........... H04B 10/1127
398/152
6,347,001 B1 * 2/2002 Arnold ................. H04B 10/118
398/124
(Continued)

FOREIGN PATENT DOCUMENTS

CN 105446346 A 3/2016
DE 102010034065 B4 10/2012
(Continued)

OTHER PUBLICATIONS

Madina Rosza et al: "Moon Image Acquisition for Pointing Calibration of LAPAN-A2 Satellite's High Resolution Camera", 2019 IEEE International Conference on Aerospace Electronics and Remote Sensing Technology (ICARES), IEEE, Oct. 17, 2019 (Oct. 17, 2019), Seiten 1-6, XP033667156.

*Primary Examiner* — Dalzid E Singh
(74) *Attorney, Agent, or Firm* — Lerner David LLP

(57) ABSTRACT

A communication unit and a method for calibrating the alignment of a communication unit in a mobile carrier platform are described. The method incudes the following steps: determining an initial alignment of the communication unit with the moon on the basis of a position and bearing of the mobile carrier platform; moving the communication unit so that it adopts the initial alignment; tracing a search pattern with the communication unit starting from the initial alignment until a detection unit detects the moon; determining a real alignment of the communication unit when the detection unit detects the moon; determining a difference between the initial alignment and the real alignment of the communication unit; using this difference when performing a target alignment with the communication unit.

10 Claims, 2 Drawing Sheets

(58) Field of Classification Search
USPC ........................................................ 398/135
See application file for complete search history.

(56) References Cited

U.S. PATENT DOCUMENTS

| | | | |
|---|---|---|---|
| 2007/0031151 A1* | 2/2007 | Cunningham | H04B 10/1123 |
| | | | 398/131 |
| 2012/0039599 A1 | 2/2012 | Von Schwake | |
| 2014/0248049 A1* | 9/2014 | Saint Georges | H04B 10/1125 |
| | | | 398/115 |
| 2016/0169658 A1 | 6/2016 | Seel | |
| 2016/0282123 A1 | 9/2016 | McCroskey et al. | |
| 2018/0288374 A1 | 10/2018 | Turner | |
| 2021/0409115 A1* | 12/2021 | Nykolak | H04B 10/1143 |

FOREIGN PATENT DOCUMENTS

| | | |
|---|---|---|
| DE | 102014018278 B4 | 1/2021 |
| EP | 4300346 A1 | 1/2024 |
| WO | 2022/179160 A1 | 9/2022 |

\* cited by examiner

CALIBRATION OF ALIGNMENT ERRORS OF A COMMUNICATION UNIT BY MEANS OF THE MOON

FIELD OF THE INVENTION

The present description generally relates to the technical field of communication technology, for example satellite communication. In particular, the description relates to an approach for calibrating a communication unit in relation to a carrier platform, or correcting alignment errors of the communication unit in relation to the carrier platform.

BACKGROUND OF THE INVENTION

Satellites are often used as carrier platforms for communication units. A communication unit of a satellite can be aligned with a remote station and can exchange data with the remote station following the alignment. Depending on the transmission technology, the communication unit needs to be aligned very precisely with the remote station, for example if transmission technologies with optical signals are used.

The communication unit can be aligned with the remote station in two steps: in a first step, a coarse alignment is carried out, followed by a fine alignment. In the course alignment, the communication unit is aligned with some uncertainty in the direction of the remote station. In the fine acquisition, the communication unit is moved according to a search pattern. During the fine acquisition, the remote station emits, for example, a signal on the basis of which it can be established whether the communication unit is correctly aligned with the remote station.

The fine acquisition is normally a time-consuming process, since optical signals in particular are strongly focused (i.e. the optical signal is emitted with a narrow beam angle) and the communication units participating in the data transmission (i.e., for example, a first transceiver and a second transceiver) have to be aligned with one another with high precision to enable them to transmit a signal with a required quality.

Therefore, the smaller the area to be scanned towards the remote station, the less time required for the fine acquisition. For this purpose, it is desirable that even the course alignment of the communication unit with the remote station is associated with minimal uncertainty.

BRIEF SUMMARY OF THE INVENTION

As aspect relates to improving the alignment of the communication unit on a mobile carrier platform in the direction of a remote station.

A method for calibrating the alignment of a communication unit in a mobile carrier platform, a communication unit for a mobile carrier platform, and a satellite with a communication unit of this type are described. The functions described in connection with the communication unit or with components of the communication unit can be implemented as steps of the method, or vice versa. It should be understood that not all functions of the communication unit are repeatedly described separately in connection with the method. However, this does not mean that these functions cannot be implemented as steps of the method. Indeed, functions of the communication unit are not described all over again as steps of the method, in order to avoid unnecessary duplication. However, it should be understood that all functions of the communication unit or of one of its components are implementable as steps of the method.

According to a first aspect, a communication unit has a suspension, a transceiver unit, a detection unit, a drive unit and a control unit. The suspension is designed to connect the communication unit to the mobile carrier platform (for example rigidly or movably). The transceiver unit is designed to set up a transmission channel to a remote station, for example in order to transmit information via the transmission channel in one or both directions. The detection unit is designed to detect an electromagnetic signal which is used, in particular, for the course alignment and/or fine acquisition of the communication unit. The drive unit is designed to move the communication unit, either relative to the carrier platform or along with the carrier platform. The control unit is designed to activate the drive unit in order to instigate the movement of the communication unit. The control unit is further designed to determine an initial alignment of the communication unit on the basis of a position and bearing of the mobile carrier platform, wherein the initial alignment corresponds to an alignment of the communication unit with the moon. The control unit is designed to activate the drive unit in such a way that the communication unit adopts the initial alignment. The control unit is designed to activate the drive unit in such a way that the communication unit moves out of the initial alignment to trace a search pattern until the detection unit detects the moon. The control unit is further designed to determine a real alignment of the communication unit when the detection unit detects the moon. The control unit is designed to determine a difference between the initial alignment and the real alignment of the communication unit and to take this difference into consideration when performing a target alignment with the communication unit.

The communication unit can be movable relative to the carrier platform, for example via a movable suspension. However, it is also conceivable for the communication unit to be rigidly connected to the carrier platform.

The transceiver unit can be equipped, for example, as a laser communication unit which is designed to transmit signals by means of optical signals. In order to be able to transmit data successfully between two stations using optical means, the two stations must normally be aligned with one another so that the signals emitted by one station can be received by the other station. The position and bearing of both stations can be used to align the stations with one another. On the basis of these data, it is possible to determine how each individual station must be aligned in order to be aligned with the other station. A high-precision alignment of the stations with one another is advantageous, particularly in laser communication, since a laser beam is normally strongly focused and therefore a precise alignment is necessary so that the remote station is located within the propagation volume of the laser beam.

The suspension is, for example, a bracket or an arm (pivotable, rotatable or generally movable), or a pivoting device which is connected on one hand to the communication unit and on the other hand to the carrier platform. The suspension is, for example, a cardanic suspension having a support frame, wherein the communication unit is mounted on the support frame. In one example, the communication unit is movable relative to the carrier platform, whereby, for example a value can be set for elevation and azimuth. The communication unit is therefore pivotable around at least two spatial axes. However, it is also conceivable for the communication unit to be pivotable around three spatial axes. If examples are described below in which reference is made to a movement around two or three spatial axes, the corresponding description applies in principle to a movement around both two and three spatial axes. In order to bring the communication unit into a desired alignment, it may suffice to set a value for elevation and azimuth. Alternatively, the alignment of the communication unit can be set using Euler angles by predefining angle values in a defined coordinate system.

In the case of a movable suspension, i.e. if the communication unit is movable in relation to the carrier platform, the drive unit acts, for example, on the suspension or a part thereof so that the communication unit is moved in relation to the mobile carrier platform and a predefined value is set for elevation and azimuth of the communication unit in relation to the mobile carrier platform. The drive unit is, for example, an electromechanical actuator or an actuator designed differently which can exert a force on the communication unit and thereby instigate the relative movement between the communication unit and a mobile carrier platform.

Due to the action of the drive unit on the communication unit, the communication unit moves and the detection unit is moved with the communication unit and traces the aforementioned search pattern.

If the communication unit is rigidly connected to the carrier platform, the drive unit can act on the entire carrier platform and spatially align the carrier platform in the manner described for the communication unit. The communication unit is also automatically moved due to the movement of the carrier platform. The drive unit then corresponds to a position control of the carrier platform and takes on the task of aligning the carrier platform along with the communication unit.

The detection unit can contain one or more sensors. These sensors are equipped to detect the direction of incidence of an electromagnetic signal, such as, for example, an optical signal. A station normally emits a signal to enable the remote station to locate the transmitting station by means of this signal. This signal is normally referred to as a beacon. The detection unit determines the direction of incidence of the signal and transmits corresponding information to the control unit, which then activates the drive unit to align the communication unit in such a way that the communication unit is aligned with the remote station. An optical signal, for example, which reaches the detection unit is used for this procedure. The communication unit can be aligned, provided that the alignment of the detection unit with the remote station is sufficiently precise and the optical signal is within the field of view or acquisition field of the detection unit. Depending on the direction of incidence of the optical signal onto the detection unit, the communication unit is moved until the optical signal reaches the detection unit at a desired angle, for example centrally.

If a mobile carrier platform with a communication unit is moved to its location of use, the communication unit must first be aligned with a remote station so that a transmission channel can be set up and signals can be exchanged. The position and bearing (spatial alignment) of the mobile carrier platform can be used to effect this alignment of the communication unit.

The mobile carrier platform is, for example, a satellite, the position and bearing of which are determined by means of positioning tools on the earth's surface and/or with a star tracker. From the position and bearing of the satellite, it is possible to determine how the communication unit needs to be aligned in order to be coarsely aligned in the direction of a desired remote station. This procedure can be referred to as course alignment. The course alignment is normally followed by a fine acquisition of the remote station. The communication unit traces a search pattern here in order to be aligned with the remote station.

The fine acquisition can be very time-consuming, since a laser beam is very strongly focused and correspondingly has a narrow beam angle. The paths which the communication unit follows when tracing the search pattern are sometimes very close to one another. It is therefore advantageous if even the course alignment of the communication unit with the remote station is affected by minimal error.

Errors of this type in the course alignment can occur, for example, as a result of the communication unit having an initially unknown offset of the relative alignment in relation to the mobile carrier platform. The absolute alignment of the communication unit which is derived from the alignment of the carrier platform and the alignment of the communication unit relative to the carrier platform is therefore errored by the offset. The approach described here serves to determine this offset of the relative alignment between the communication unit and the mobile carrier platform. This offset corresponds to the aforementioned difference between the initial alignment and the real alignment of the communication unit.

If the control unit moves the communication unit into a predefined alignment, the offset between the communication unit and the mobile carrier platform, on the basis of which control commands are determined for the alignment of the communication unit with the carrier platform, is also taken into account in addition to the position and/or alignment of the mobile carrier platform.

The bearing of the communication unit relative to the mobile carrier platform or the offset can be referred to as the tipping of the communication unit in relation to the mobile carrier platform. This tipping is normally caused by the manufacturing and assembly tolerances of the communication unit in the mobile carrier platform and/or by the manufacturing of the components of the communication unit, in particular the suspension.

The tipping is normally different in each mobile carrier platform, so that it can be very time-consuming to align the transceiver unit with the remote station, despite the known position and bearing of the mobile carrier platform, since a relatively large area has to be scanned in order to align the transceiver unit with the remote station. The tipping is a consequence of the tolerances and inaccuracies in the manufacture or assembly of the communication unit. The tipping has different values and directions for different communication units and/or mobile carrier platforms, so that a value for the three spatial axes of the tipping must be determined individually for each communication unit or mobile carrier platform. If the tipping (i.e. the relative bearing between the communication unit and the mobile carrier platform using three solid angles) is known, the communication unit can be aligned with the remote station with higher precision on the basis of the known position and bearing of the mobile carrier platform. In other words, the area towards the remote station that has to be scanned is delimited, or this area in which the remote station is located can be approached with greater precision with knowledge of the tipping between the communication unit and the mobile carrier platform. A search run is then started by means of the detection unit in order to align the communication unit with the remote station.

Euler angles can be used for the mobile carrier platform to describe the alignment. A Euler angle describes, for example, the bearing of the carrier platform in a defined coordinate system. The attitude reference frame (ARF) is often used for satellites. An axis of the ARF, starting from the satellite, is aligned along the direction of movement, and a further axis, starting from the satellite, points in the direction of the earth or away from it. Euler angles can be used to indicate the relative alignment of the mobile carrier platform in the ARF.

Euler angles can be used for the communication unit to indicate the alignment relative to the mobile carrier platform or to indicate the alignment of the communication unit in the defined coordinate system in which the alignment of the carrier platform or of the communication unit is also described.

Generally speaking, the absolute alignment of the communication unit in the global three-dimensional coordinate system can be determined on the basis of the absolute alignment of the carrier platform and the relative alignment between the communication unit and the carrier platform. At this juncture, consideration is given to the offset described above which is introduced into the system by assembly and manufacturing tolerances of the communication unit and/or the carrier platform. The absolute alignment of the communication unit is therefore determined on the basis of the absolute alignment of the carrier platform, the relative alignment between the communication unit and the carrier platform, and the offset.

It is proposed here to use the moon in order to determine the offset. From the known position and bearing of the carrier platform, it is determined how the communication unit needs to be aligned without taking into consideration the offset in order to be aligned with the moon at the present time (target alignment). The control unit activates the drive unit so that the communication unit is aligned accordingly. The detection unit is designed to determine whether the communication unit is really aligned with the moon. If so, i.e. the communication unit having the target alignment is really aligned with the moon, the system contains no offset between the alignment of the communication unit and the alignment of the carrier platform, or the system has a predefined and known offset. However, if the communication unit having the target alignment is not aligned with the moon, the control unit activates the drive unit so that the communication unit traces a search pattern and is aligned with the moon. When tracing the search pattern, the communication unit is moved relative to the carrier platform according to a predefined scheme and the detection unit determines whether or when the communication unit is aligned exactly with the moon. The communication unit is therefore moved into an actual alignment in which it is really aligned with the moon. When the actual alignment is in this state, the offset can be determined as the difference between the initial alignment with the calculated position of the moon (target alignment) and the real alignment (actual alignment) with the real position of the moon.

If the communication unit then has to be aligned in a specific direction, the absolute alignment of the carrier platform, the offset and the necessary alignment of the communication unit relative to the carrier platform are used.

In one embodiment, the detection unit has an acquisition field which is dimensioned in such a way that the moon in a full-moon phase can be captured completely in the acquisition field.

If the communication unit and therefore the detection unit are thus aligned with the moon, the apparent size of the moon in the full-moon phase fits into the acquisition field and the communication unit can be aligned very precisely due to the largely circular shape of the moon illuminated by the sun.

The detection unit thus enables the communication unit to be aligned with the moon with high precision. The field of view or acquisition field of the detection unit is dimensioned in such a way that a beam angle of the field of view, taking into consideration the distance to the moon and the apparent size of the moon, captures the moon completely when the moon is full.

In a further embodiment, the detection unit contains a four-quadrant diode and is designed to measure an illumination intensity of the moon in each quadrant of the four quadrants and to transmit the measured illumination intensity to the control unit. The control unit is designed to move the communication unit according to the search pattern until the illumination intensity in the four quadrants is identical.

This means that the moon is disposed centrally in the acquisition field of the detection unit and the communication unit or the detection unit can be aligned with the moon in a simple manner and with high precision.

Using the four-quadrant diode, the communication unit can be aligned with the moon as follows: the assumed position of the moon is first tracked on the basis of the position and alignment of the carrier platform; a search pattern is then traced and at the same time a light incidence into the four quadrants of the diode is measured; if a threshold value for the light incidence is exceeded in one quadrant, a search pattern for the moon tracking is activated in which the control unit activates the drive unit in such a way that the communication unit or the detection unit is aligned so that all quadrants of the four-quadrant diode are subjected to the same light incidence.

The offset between the communication unit and the carrier platform can be determined locally by the control unit. Alternatively, the measured values can be transmitted to a remote station on the earth's surface which determines the offset and transmits it to the control unit of the communication unit. In any event, the offset is taken into consideration locally by the control unit of the communication unit which aligns the communication unit with a desired remote station and uses the alignment of the carrier platform and the offset between the communication unit and the carrier platform here, as described above.

In a further embodiment, the drive unit is designed to move the communication unit with at least two rotational degrees of freedom.

Either the communication unit can be pivoted in terms of elevation and azimuth, or a bearing angle can be set in relation to all three spatial axes in a three-dimensional coordinate system.

In a further embodiment, the transceiver unit is an optical communication unit.

An optical communication unit within the meaning of this description uses optical signals to transmit information. The transceiver unit is, for example, a laser communication unit. For laser communication units in particular, the laser beam used to transmit information is strongly focused and therefore a high-precision alignment of the stations participating in the transmission is necessary. For this purpose, it is helpful to provide a course alignment that is as reliable as possible for the fine acquisition of the participating stations. With knowledge of the offset between the communication unit and the carrier platform, the course alignment can be performed comparatively reliably so that the fine acquisition can be carried out in a shorter period of time.

The transceiver unit is essentially equipped to emit an optical signal in order to transmit information, and to receive an optical signal in order to receive information.

In a further embodiment, the drive unit has at least one electromechanical actuator.

The drive unit can have a separate actuator for each movement direction or pivot direction of the communication unit. The drive unit preferably has two or three actuators. Redundant actuators can be provided in order to compensate the failure of an actuator.

According to a further aspect, a satellite is indicated which has a communication unit as described herein.

The satellite can contain one or more communication units as described herein. The one or more communication units with their detection unit are initially aligned with the moon in order to determine an offset between each communication unit and the satellite. The offset then enables the respective communication unit to be coarsely aligned with the desired remote station, taking into consideration the offset, in order to then start the fine acquisition between each communication unit and the respective remote station.

The offset is preferably determined after a satellite has been put into orbit. The offset between the communication unit and the satellite typically results from manufacturing and assembly tolerances, so that a one-off determination of the offset for a communication unit after the commissioning of the satellite or the communication unit is sufficient.

The determination of the offset can be repeated if it is established that the fine acquisition takes too long. This could result from the offset having been determined imprecisely and the course alignment of the communication unit with the desired remote station having been performed too imprecisely.

According to a further aspect, a method is indicated for calibrating the alignment of a communication unit in a mobile carrier platform. The method comprises the following steps: determining an initial alignment of the communication platform with the moon based on a position and bearing of the mobile carrier platform (the initial alignment can also be referred to as the target alignment); moving the communication unit so that it adopts the initial alignment; tracing a search pattern with the communication unit starting from the initial alignment until a detection unit detects the moon; determining a real alignment of the communication unit when the detection unit detects the moon (this real alignment, when the detection unit has detected the moon, preferably centrally in the acquisition field, can be referred to as the actual alignment); determining a difference between the initial alignment and the real alignment of the communication unit (i.e. the difference between the target alignment and the actual alignment); using this difference when performing a target alignment with the communication unit.

This method avoids having to determine the precise alignment of the communication unit in relation to the carrier platform with complex measurements before the carrier platform is put into service. Instead, the offset between the communication unit and the carrier platform is determined at the start of commissioning or immediately before commissioning using the moon and the approach described herein. The amount of time required for the fine acquisition is reduced if the offset between the communication unit and the carrier platform is determined. The moon, with its precisely known position, is used here instead as a beacon. The detection unit which has at least one acquisition sensor has a field of view which is minimally larger than the apparent diameter of the moon during the full-moon phase. The field of view is, for example, 10 mrad, whereas the apparent size of the moon is slightly less, i.e. approximately 9 mrad or more. The detection unit can thus measure a centring error of the moon in the field of view, thus enabling the detection unit to be aligned with the moon with high precision.

Even though reference is made in this description to the moon during the full-moon phase, the moon can also be used in a different moon phase as a beacon for the calibration. Correction factors can be applied here to the alignment of the detection unit depending on the current phase of the moon in order to compensate centring errors.

In order to improve the precision of the calibration, the offset of the communication unit in relation to the carrier platform can be determined multiple times, in particular with different alignments of the moon relative to the carrier platform. The offset can be determined, for example, in a first pass. The offset can be determined in a second pass if the alignment of the carrier platform relative to the moon has changed. A plurality of such passes can be executed for different alignments of the carrier platform relative to the moon.

The calibration, i.e. the determination of the offset, can be performed independently from a remote station, since the moon is used as a beacon. A plurality of communication units on one or more carrier platforms can obviously be calibrated.

The method corresponds to the functional features that have been described in connection with the control unit of the communication unit. The individual steps are not described again at this point. Instead, reference is made to the details relating to the functions of the control unit which apply accordingly in the same manner to this method also.

In one embodiment, the method further comprises the following steps: measuring an illumination intensity of the moon with a four-quadrant diode; moving the communication unit according to the search pattern until the illumination intensity in the four quadrants is identical.

In a further embodiment, the communication unit is moved by at least two rotational degrees of freedom when the communication unit is moved according to the search pattern.

BRIEF DESCRIPTION OF THE DRAWINGS

Exemplary embodiments are described in detail below with reference to the attached drawings. The illustrations are schematic and are not true-to-scale. The same reference signs refer to the same or similar elements. In the drawings.

DETAILED DESCRIPTION

Figure 1:
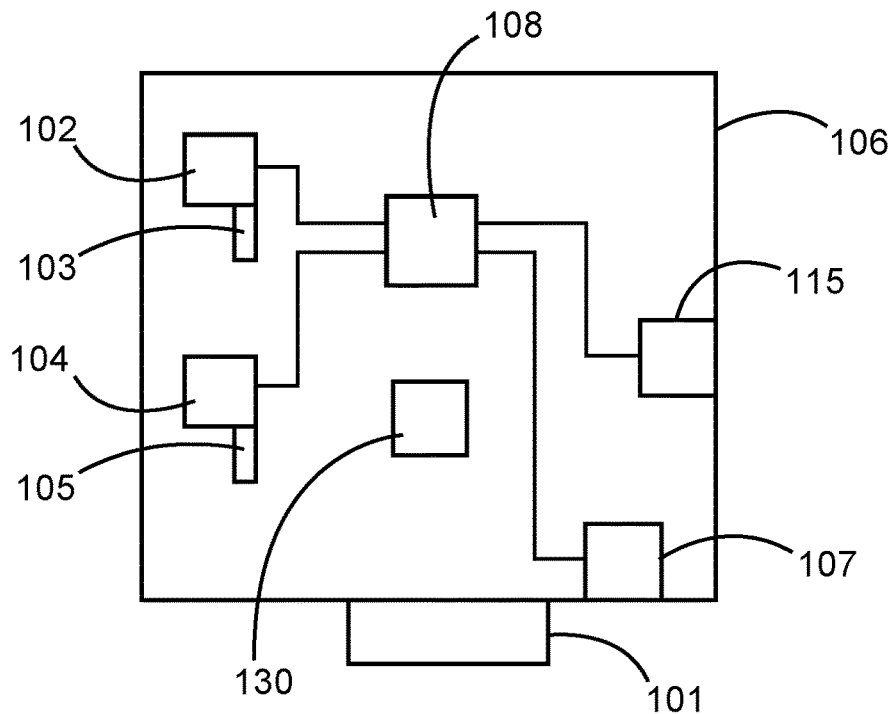
FIG. 1 shows a schematic representation of a communication unit.

FIG. 1 shows a communication unit 106. The communication unit 106 is connected to a suspension 101 which connects the communication unit 106 to a carrier platform (not shown, see FIG. 2). The communication unit 106 further has a drive unit 107 which is designed to move the communication unit 106 in relation to the carrier platform. The drive unit 107 is designed, for example, as a motor and acts on the suspension 101 in order to move the communication unit 106. The drive unit 107 can contain one or more motors.

The communication unit 106 has a bearing sensor unit 115. The bearing sensor unit 115 is designed to determine the bearing or alignment of the communication unit 106. In particular, the bearing sensor unit 115 determines the relative bearing between the communication unit 106 and the carrier platform.

The communication unit 106 further has two detection sensors 102, 104. The two detection sensors together form the detection unit. The first detection sensor 102 is connected by means of an attachment 103 to the communication unit 106. The second detection sensor 104 is connected by means of an attachment 105 to the communication unit 106. The detection sensors 102, 104 can be designed, for example, as four-quadrant sensors. The detection sensors 102, 104 serve to align the communication unit 106 with a remote station and to determine the offset between the communication unit and the carrier platform using the moon.

The communication unit 106 further has a control unit 108. The control unit 108 is functionally coupled to the other components of the communication unit 106. The control unit 108 thus receives measured values from the detection sensors 102, 104 and from the bearing sensor unit 115, and controls the drive unit 107 in order to move the communication unit 106, for example to execute a rotational movement in at least two rotational degrees of freedom.

The control unit 108 is designed, for example, as a controller or computer in order to execute predefined instructions and activate the components accordingly.

The communication unit 106 further has a transceiver unit 130 which is designed as a laser communication terminal. The transceiver unit 130 is designed to emit and receive optical signals.

Figure 2:
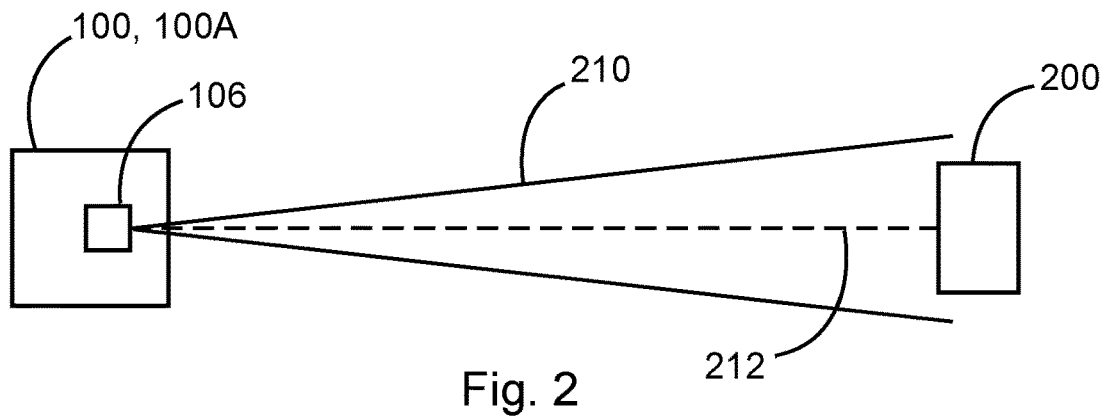
FIG. 2 shows a schematic representation of a carrier platform and a remote station.

FIG. 2 shows a carrier platform 100 in the form of a satellite 100A. The carrier platform 100 contains a communication unit 106. Although only one communication unit 106 is shown on board the carrier platform 100 in FIG. 2, the carrier platform 100 can contain a plurality of communication units 106.

The communication unit 106 emits a transmission signal 210 having a signal axis 212. The transmission signal 210 is preferably an optical signal which is emitted by a laser in the transceiver unit 130 (see FIG. 1). The laser has a narrow beam angle since the signal is correspondingly strongly focused.

To enable information to be transmitted from the carrier platform 100 to the remote station 200, the remote station 200 must be able to acquire the transmission signal, i.e. the remote station 200 must be located in the propagation volume of the transmission signal 210, and the transmission signal must be in the acquisition area or acquisition field of the remote station 200, i.e. the remote station 200 must also be aligned sufficiently precisely with the carrier platform 100. In this case, the remote station can detect the transmission signal 210.

FIG. 2 shows only the transmission signal from the carrier platform 100 to the remote station 200. However, a transmission signal can obviously similarly be emitted from the remote station 200 to the carrier platform 100.

Figure 3:
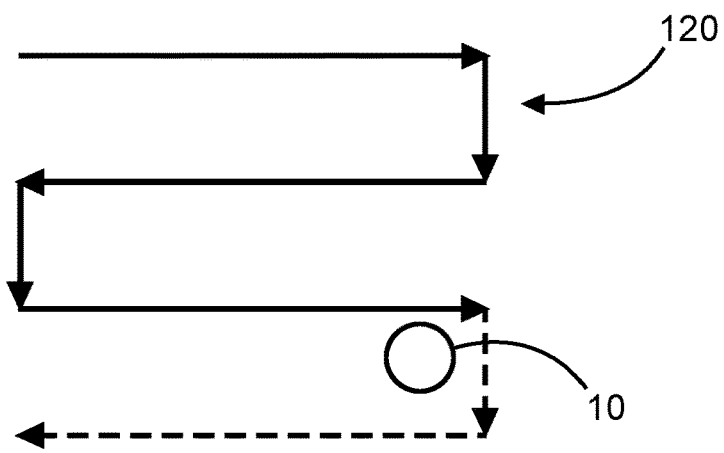
FIG. 3 shows a schematic representation of a search pattern which the communication unit traces.

FIG. 3 shows a search pattern 120 which is traced by the communication unit 106, i.e. the drive unit moves the communication unit in such a way that the acquisition field of the detection unit follows the search pattern 120. This search pattern 120 is traced so that the communication unit is aligned with the moon 10.

As soon as the acquisition field of the detection unit approaches the moon, the brightness in the acquisition field of the detection unit increases. The communication unit traces the search pattern 120 until an increased brightness is detected. This results in a deviation from the predefined search pattern 100 in order to detect the moon 10 precisely. In the representation in FIG. 3, this is shown by indicating a part of the search pattern 120 with dashed lines. The dashed lines are no longer traced by the communication unit, since the moon is partially detected by the acquisition field of the detection unit at a certain point in the search pattern 120, and the acquisition of the moon 10 is then performed.

In particular, the communication unit is then moved in such a way that the acquisition field acquires the moon centrally. This state is shown in FIG. 4.

Figure 4:
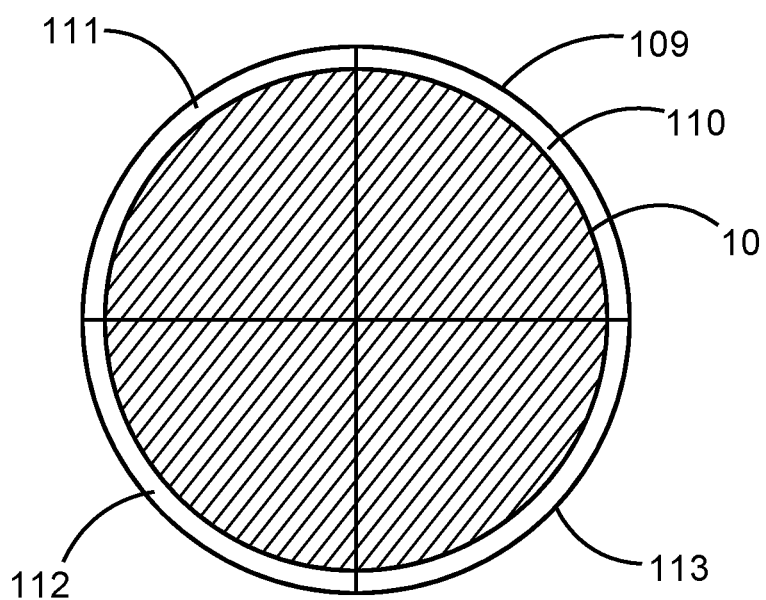
FIG. 4 shows a schematic representation of the acquisition field of the detection unit with the moon centred therein.

FIG. 4 shows an acquisition field 109 of a four-quadrant diode which is used as a detection sensor. The acquisition field 109 is subdivided into four quadrants 110, 111, 112, 113. The acquisition field is, for example, circular, and the quadrants extend in each case over an area of equal size. In the present example, a quadrant has the shape of a quarter circle. The moon 10 is disposed centrally in the acquisition field 109 if each quadrant 110, 111, 112, 113 supplies the same value for the illumination intensity.

The representation in FIG. 4 shows that the apparent size of the moon 10 is slightly smaller than the size of the acquisition field 109.

Figure 5:
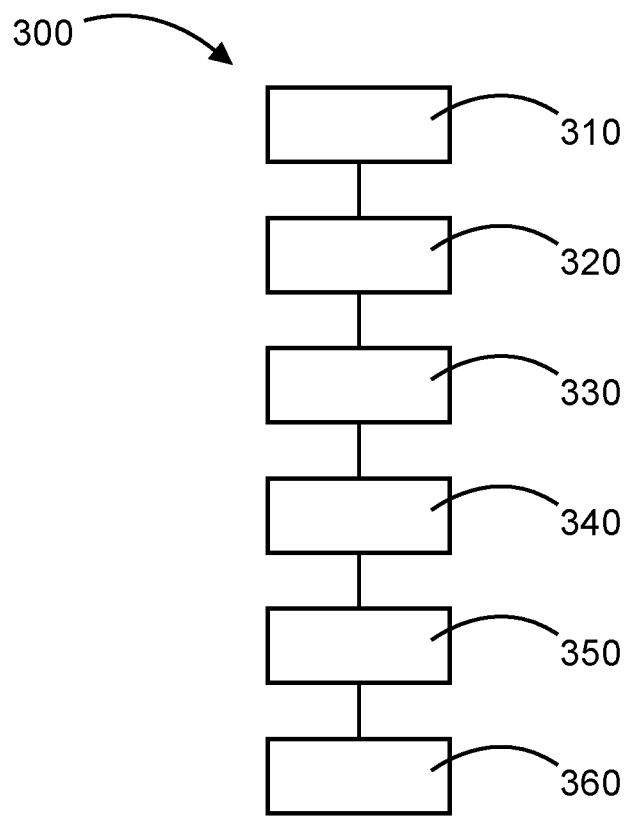
FIG. 5 shows a schematic representation of the steps of a method for calibrating the alignment of a communication unit in relation to a carrier platform.

FIG. 5 is a schematic representation of the steps of a method 300 for calibrating the alignment of a communication unit in a mobile carrier platform. The method is preferably applied in connection with the communication unit 106 as shown in FIG. 1 and the satellite 100A as shown in FIG. 2.

In this example, the method 300 comprises the following steps: in a first step 310, determining an initial alignment of the communication unit 106 with the moon on the basis of a position and bearing of the mobile carrier platform 100; in a second step 320, moving the communication unit 106 so that it adopts the initial alignment; in a third step 330, tracing a search pattern with the communication unit 106 starting from the initial alignment until a detection unit detects the moon; in a fourth step 340, determining a real alignment of the communication unit 106 when the detection unit detects the moon; in a fifth step 350, determining a difference between the initial alignment and the real alignment of the communication unit; in a sixth step 360, using this difference when performing a target alignment with the communication unit 106.

It should additionally be noted that "comprising" or "having" does not exclude other elements or steps and "a/an" or "one" does not exclude a multiplicity. It should further be noted that features or steps that have been described with reference to one of the above exemplary embodiments can also be used in combination with other features or steps of other exemplary embodiments described above. Reference symbols in the claims are not to be regarded as a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST

10 Moon
100 Carrier platform
100A Satellite
101 Suspension
102 First sensor of the detection unit
103 Attachment
104 Second sensor of the detection unit
105 Attachment
106 Communication unit
107 Drive unit
108 Control unit
109 Acquisition field of a four-quadrant diode
110 First quadrant
111 Second quadrant
112 Third quadrant
113 Fourth quadrant
115 Bearing sensor unit
120 Search pattern
130 Transceiver unit
200 Remote station
210 Transmission signal
212 Signal axis
300 Method

The invention claimed is:

1. A communication unit for a mobile carrier platform, the communication unit comprising:
a suspension configured to connect the communication unit to the mobile carrier platform;
a transceiver unit configured to set up a transmission channel to a remote station;
a detection unit configured to capture an electromagnetic signal;
a drive unit configured to move the communication unit;
a control unit configured to activate the drive unit in order to instigate the movement of the communication unit;
wherein the control unit configured to determine an initial alignment of the communication unit on the basis of a position and bearing of the mobile carrier platform, wherein the initial alignment corresponds to an alignment of the communication unit with the moon;
wherein the control unit configured to activate the drive unit in such a way that the communication unit adopts the initial alignment;
wherein the control unit configured to activate the drive unit in such a way that the communication unit moves out of the initial alignment to trace a search pattern until the detection unit detects the moon;
wherein the control unit is further configured to determine a real alignment of the communication unit when the detection unit detects the moon; and
wherein the control unit is configured to determine a difference between the initial alignment and the real alignment of the communication unit and to take the difference into consideration when performing a target alignment with the communication unit.

2. The communication unit according to claim 1, wherein the detection unit has an acquisition field dimensioned in such a way that the moon in a full-moon phase can be captured completely in the acquisition field.

3. The communication unit according to claim 1,
wherein the detection unit comprises a four-quadrant diode and is configured to measure an illumination intensity of the moon in each quadrant of the four quadrants and to transmit the measured illumination intensity to the control unit; and
wherein the control unit is configured to move the communication unit according to the search pattern until the illumination intensity in the four quadrants is identical.

4. The communication unit according to claim 1, wherein the drive unit is configured to move the communication unit with at least two rotational degrees of freedom.

5. The communication unit according to claim 1, wherein the transceiver unit is an optical communication unit.

6. The communication unit according to claim 1, wherein the drive unit has at least one electromechanical actuator.

7. A satellite comprising a communication unit according to claim 1.

8. A method for calibrating the alignment of a communication unit in a mobile carrier platform, the method comprising:
determining an initial alignment of the communication unit with the moon on the basis of a position and bearing of the mobile carrier platform;
moving the communication unit so that the communication unit adopts the initial alignment;
tracing a search pattern with the communication unit starting from the initial alignment until a detection unit detects the moon;
determining a real alignment of the communication unit when the detection unit detects the moon;
determining a difference between the initial alignment and the real alignment of the communication unit; and
using the difference when performing a target alignment with the communication unit.

9. The method according to claim 8, further comprising:
measuring an illumination intensity of the moon with a four-quadrant diode; and
moving the communication unit according to the search pattern until the illumination intensity in the four quadrants is identical.

10. The method according to claim 9, wherein the communication unit is moved by at least two rotational degrees of freedom when the communication unit is moved according to the search pattern.

* * * * *